United States Patent
Wieber (10) Patent No.: US 9,559,991 B1
(45) Date of Patent: Jan. 31, 2017

(54) AUTOMATED TEXT RESPONSE SYSTEM

(71) Applicant: Judith M. Wieber, Huntington, NY (US)

(72) Inventor: Judith M. Wieber, Huntington, NY (US)

( * ) Notice: Subject to any disclaimer, the term of this patent is extended or adjusted under 35 U.S.C. 154(b) by 48 days.

(21) Appl. No.: 14/631,256

(22) Filed: Feb. 25, 2015

Related U.S. Application Data (60) Provisional application No. 61/944,283, filed on Feb. 25, 2014.

(51) Int. Cl.
*H04W 4/00* (2009.01)
*H04L 12/58* (2006.01)
*H04W 4/14* (2009.01)

(52) U.S. Cl.
CPC ............... *H04L 51/02* (2013.01); *H04W 4/14* (2013.01)

(58) Field of Classification Search
CPC .................................. H04L 51/02; H04W 4/14
USPC ....................................................... 455/466
See application file for complete search history.

(56) References Cited

U.S. PATENT DOCUMENTS

| | | | |
|---|---|---|---|
| 8,442,563 B2* | 5/2013 | Chen | G06F 17/30976 455/412.1 |
| 2002/0187794 A1* | 12/2002 | Fostick | H04L 12/5895 455/466 |
| 2004/0107088 A1 | 6/2004 | Budzinski | |
| 2005/0033713 A1 | 2/2005 | Bala et al. | |
| 2007/0135100 A1* | 6/2007 | Wang | H04M 3/4874 455/412.2 |
| 2008/0256200 A1 | 10/2008 | Elliston | |
| 2012/0030115 A1* | 2/2012 | Peace | G06Q 20/382 705/44 |
| 2013/0346309 A1* | 12/2013 | Giori | G06Q 20/0655 705/43 |

FOREIGN PATENT DOCUMENTS

| | | |
|---|---|---|
| EP | 1255414 A2 | 6/2002 |
| EP | 1781004 A1 | 8/2005 |
| WO | 2007067528 A2 | 6/2007 |
| WO | 2010133830 A1 | 11/2010 |

* cited by examiner

*Primary Examiner* — Tanmay Shah
(74) *Attorney, Agent, or Firm* — Robert C. Montgomery; Montgomery Patent & Design, LP.

(57) ABSTRACT

An automated message response system includes computer programmable software that stores a bank of pre-recorded responses. Each response is capable of being entered into a remote database into a response bank. Each response bank is associated with inputted parameter constraints. A user of the system can set up the automatic message response system to deliver a desired response automatically based on an incoming message, or the response can be delivered manually.

44 Claims, 10 Drawing Sheets

AUTOMATED TEXT RESPONSE SYSTEM

RELATED APPLICATIONS

The present invention is a continuation-in-part of, was first described in, and claims the benefit of U.S. Provisional Application No. 61/944,283, filed Feb. 25, 2014, the entire disclosures of which are incorporated herein by reference.

FIELD OF THE INVENTION

The present invention relates to application software that enables tailored automated short message service responses to messages incoming to a mobile electronic device.

BACKGROUND OF THE INVENTION

Street and highway safety is at the forefront of concerns when speaking in regards to public safety. With the ever increasing volume of cars on the road, deaths and injuries resulting from traffic accidents continue to be an all too common occurrence. While some of these accidents are related to weather, poor driving conditions, mechanical failure, and the like, many are due to distracted driving. Recent spikes in accident rates due to distracted driving are primarily attributed to drivers who use cellular phones to text while driving. While educational awareness programs continue to provide some benefits, the news is still filled everyday with accidents and even deaths that continue to occur while drivers are using cellular phones. Accordingly, there exists a need for a means by which the necessity of motor vehicle drivers to text message can be greatly reduced, but yet still allow use of status and update communications. The development of the present invention fulfills this need.

SUMMARY OF THE INVENTION

It is therefore an object of the present invention to provide such an automated message service response system including a web-based database configured to store coalesced data and generate at least one response bank with said coalesced data and an application software, capable of being stored on a mobile electronic device, configured to establish communication between the mobile electronic device and the database via a carrier signal.

It is therefore an object of the present invention to provide such an application software to establish a key code for the mobile electronic device to be carried along with the carrier signal. Once the key code is verified by the database, the application software enables generation of each response bank with associated parametric constraints via use of an interfacing unit. The application software enables storage of at least one automated message within each response bank that are conditioned upon the parametric constraints. In at least one (1) embodiment, the application software is further configured to deliver an initial response asking a sender to engage in use of the system. Such a selectable feature enables activation or deactivation from communication with another database incorporating such a system.

Another object of the present invention is to provide such an application software to enable association of each response bank with a carrier signal of an incoming message to the mobile electronic device. The application software selectively generates and delivers a desired automated message selected from an associated response bank, either based upon receipt of an incoming message, or upon manual activation thereof. The incoming message is typically in the form of one (1) of the following: a time of day, a location, a scanning of a bar code, a proximity to an RF-based tag, a voice command, an incoming phone calls, and an incoming email. In another embodiment, the application software utilizes pattern recognition to identify and anticipate a desired automated message upon receipt of an incoming message and selectively delivers that desired automated message.

Yet another object of the present invention enables the application software to emit a specific tone and announce a name of a sender of said incoming message.

Yet another object of the present invention provides for a user to generate the parametric constraints by input within the application software via the interface unit for subsequent storage within the database. An individualized set of parametric constraints are capable of being associated with a particular sender of said incoming message. In certain embodiments, the parametric constraints include a physical criteria or an input condition. The automated messages are also generated by input within the application software via the interface unit for subsequent storage within each response bank. In certain embodiments, an additional automated message is capable of being added to a pre-existing response bank. In other certain embodiments, each automated message is capable of being edited.

In a preferred embodiment, each automated message is delivered via SMS communication protocol. In certain embodiments, each automated message can be a text message, a pictorial message, a pre-recorded audio clip, and a pre-recorded video clip.

In yet another object of the present invention, GPS coordinates associated with the mobile electronic device can be selectively transmitted concurrently with the desired automated message.

In still yet another objection of the present invention, the application software is capable of delivering the desired automated message to multiple recipients.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 automated text response system
11 mobile electronic device
20 application software
30 automated text message
40 physical criteria
50 input condition
60 web-based database
70 unique code key
80 response bank
90 recognition sequence
100 interfacing unit
210 log-in graphical screen
215 multiple log-in access methods
220 first auxiliary control
225 auto message graphical screen
230 individual automated messages
235 message header
240 message delivery schedule
245 message content
250 message recipient
255 message activation toggle
260 message attachment icon
265 message add selection button
270 message edit selection button
275 add auto message graphical screen
280 auto message name
285 auto message trigger
290 auto message recipient
295 auto message schedule
300 auto message content
305 auto message save button
310 auto message cancel button
315 trigger selection graphical screen
320 time trigger selection option
325 GPS trigger selection option
330 incoming communication selection option
335 first return button
340 first done button
345 time trigger graphical screen
350 rotary selection control
355 second return button
360 second done button
365 GPS trigger graphical screen
370 map location icon
375 third return button
380 third done button
385 message now settings graphical screen
390 message now sequence listing
395 message now number selection
400 message now message recipient
405 message now message content
410 message now message attachment
415 message now new message selection button
420 message now message setting return button
425 add message now graphical screen
430 add message now number
435 add message now recipient
440 add message now message content
445 add message now message attachment
450 add message now message save button
455 add message now return button
460 message now activation graphical screen
465 number pad
470 individual number button
475 picture send graphical screen
480 add picture recipient button
485 picture recipient list
490 camera access button
495 more graphical screen
500 groups selection option
505 setting selection option
510 logout selection option
515 more selection button
520 groups control graphical screen
525 groups list
530 groups add button
535 more return button
540 add group graphical screen
545 group name field
550 group member field
555 add group member recipient button
560 group definition save button
565 group definition cancel button
570 settings graphical screen
575 user name field
580 user password field
585 message now setup option
590 opt-in toggle selection
595 settings save button
600 settings return button
605 offers graphical screen
610 list of offers
615 individual offer in store codes
620 offer email box button

DETAILED DESCRIPTION OF THE PREFERRED EMBODIMENT

The best mode for carrying out the invention is presented in terms of its preferred embodiment, herein depicted within FIGS. 1 through 17. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes application software 20 with automated text message 30 response capabilities (herein referred to as the "system) 10 based upon parametric constraints such as input conditions 50 and other physical criteria 40, which coordinates responses via a web-based database 60.

Figure 1:
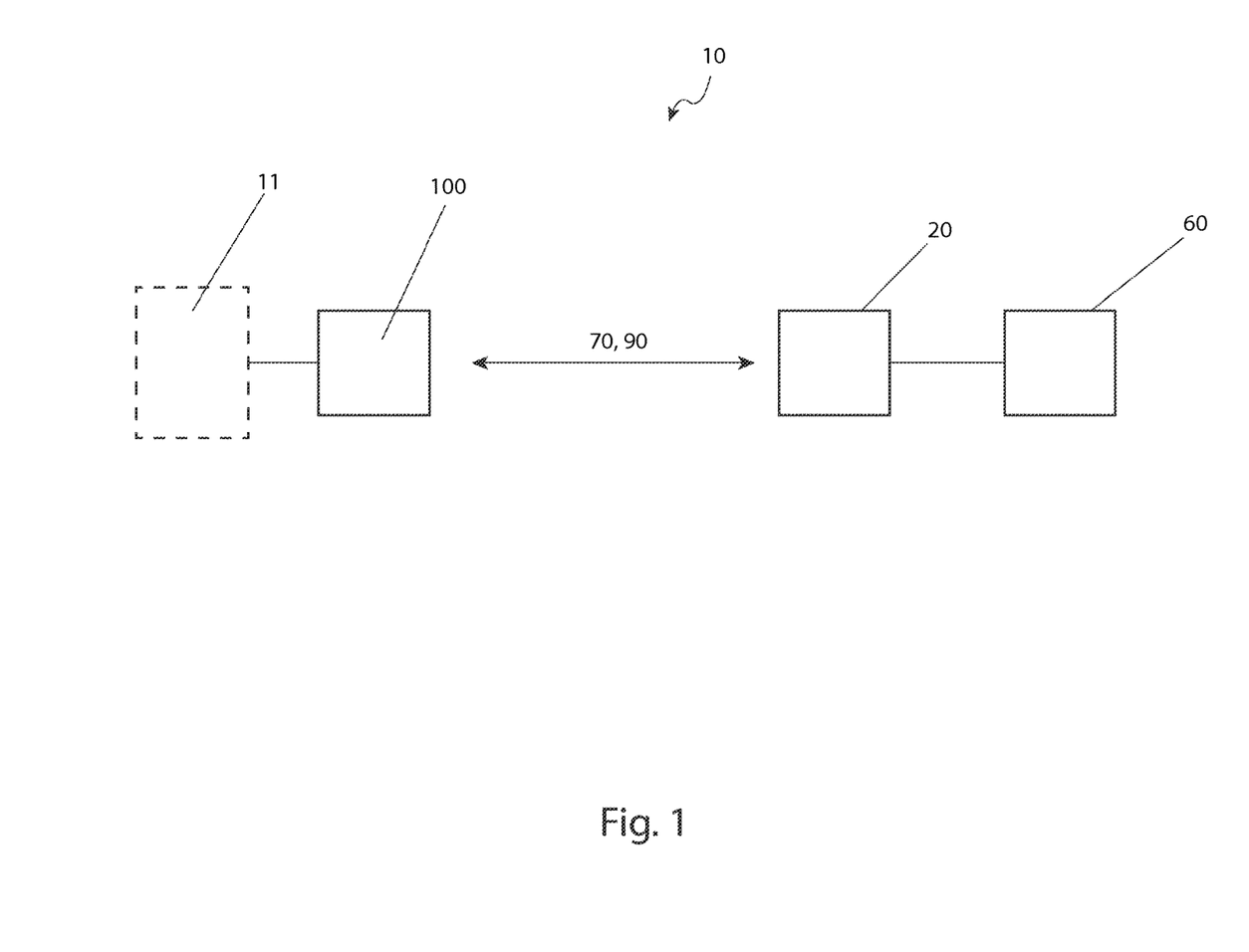
FIG. 1 is a flow schematic of the automated text response system 10, in accordance with the preferred embodiment of the present invention.
Figure 2:
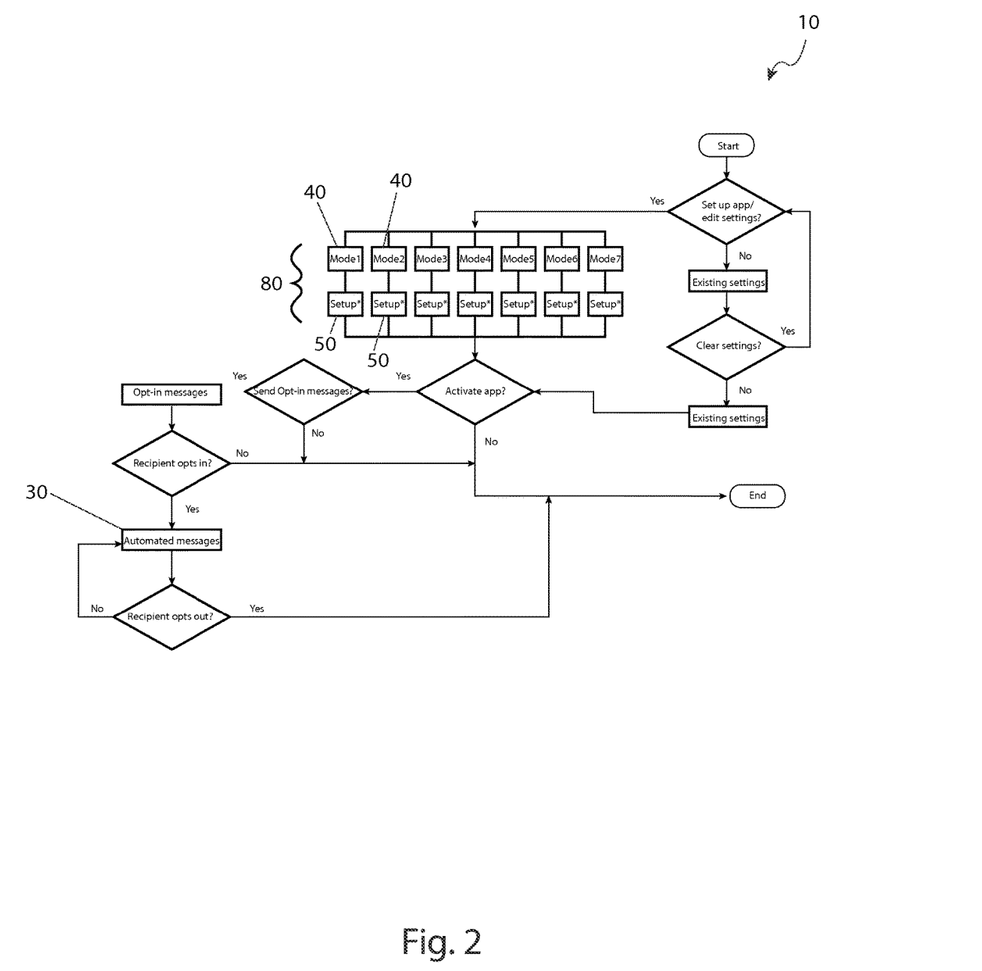
FIG. 2 is a decision tree flow chart of the system 10, in accordance with the preferred embodiment of the present invention.

Referring now to FIGS. 1 and 2, a flow schematic of the automated text response system 10 and a decision tree flow chart of the system 10, in accordance with the preferred embodiment of the present invention, are disclosed. The system 10 is a method performed by application software 20 by which mobile electronic devices 11 provide an automated text message 30 in response to specific physical criteria 40 and input conditions 50. While the primary concern is to reduce the dangers of text messaging while driving, the system 10 may be used to provide an automated text message 30 response for a variety of other situations. After installing the system 10 on a mobile electronic device 11, a user sets up a series of automated response texts 30 that would be automatically generated and sent by the mobile electronic device 11 in response to certain physical criteria 40 as dictated by input conditions 50. As an example, an incoming text reading "where are you?" received by a mobile electronic device 11 having the system 10 would initiate a sequencing by the application software 20 to recognize the question and respond with a pre-determined text response along with GPS coordinates acquisitioned from the internal GPS system of the mobile electronic device 11. Other stimuli include time of day, location, scanning of a bar code, proximity to an RF based tag, voice commands, incoming phone calls, incoming emails, and the like. It is envisioned for all of the parameters to be set up ahead of time before a trip in a motor vehicle begins or some other event in which a user wishes to employ the automated response. The application software 20 preferably relies on a web-based database 60 via a data or wifi connection. While the written description of the system 10 references incoming messages as texts, the system 10 is not limited to SMS communications. Automated text message 30 responses may also be applicable to incoming phone calls and emails without deviating from the teachings of the system 10.

Integral to the operation of the system 10 is the application software 20 that is installed onto the mobile electronic device 11. This application software 20 is configured to dictate algorithmic functions of the central processor of the mobile electronic device 11 and initiate communication with an external computer network via a web-based database 60. It is necessary to have an application software 20 compatible with the operating system of the particular mobile electronic device 11; therefore, various versions of the application software 20 may be provided. However, each version is configured to perform the same functions to be described in the written description of the system 10, thus each separate version is not to be interpreted as a limiting factor and each separate version may be utilized without deviating from the teachings of the system 10. Once installed, the mobile electronic device 11 is placed into communication with the web-based database 60, whereby command inputs onto the mobile electronic device 11 commence the application software 20 program and initiate communication between the mobile electronic device 11 and the web-based database 60. Each electronic mobile device 11 operates on a carrier signal for telecommunication purposes, so this carrier signal is used to establish a unique code key 70 for that particular electronic mobile device 11, which is stored with the web-based database 60. Once this occurs, the system 10 is now set up for operation for use on a user's mobile electronic device 11.

The application software 20 is configured to enable transfer of the unique code key 70 between the electronic mobile device 11 and the web-based database 60 along the carrier signal associated with that electronic mobile device 11. The carrier signal and unique code key 70 serve as a proxy to identify when an incoming message is being sent to that particular electronic mobile device 11 and from which response bank 80 of the web-based database 60 to acquisition the automated text message 30 that will be sent from that electronic mobile device 11. When an incoming message is sent to an electronic mobile device 11 equipped with the application software 20, a recognition sequence 90 is performed to identify the unique code key 70 and determine if any input conditions 50 have been set for the carrier signal of that incoming message.

Each mobile electronic device 11 is provided with an interfacing unit 100 to enable communication with a processor chip to perform input/output operations by conducting algorithmic functions of a computer program. This interfacing unit 100 is typically the keypad or virtual keyboard of the mobile electronic device 11. The application software 20 establishes communication with the interfacing unit 100 to act as one (1) of the computer programs supplying the algorithmic functions. This established communication enables a user to set up input conditions 50 and allows the application software to acquisition other physical criteria 40 data. The input conditions 50 and physical criteria 40 data are used as parametric constraints by the application software 20 for the operation of the system 10. Input conditions 50 and physical criteria 40, or at least the acquisitioning functions of them, are stored with the web-based database 60 upon command inputs by a user through the interfacing unit 100. A user first establishes a response bank 80 for each telephone number and/or email address that a user desires to set up an automated text message 30 for. Various data may be programmed for each response bank 80 so as to tailor the response from each response bank 80 based upon parametric constraints set by the user. The application software 20 is also configured for pattern recognition to identify and anticipate a desired response by an incoming message.

The parametric constraints comprise physical criteria 40 and input conditions 50, which are then assimilated into input/output equations to be carried out by algorithmic functions. Typical physical criteria 40 may include GPS coordinates, the date, time of day, temperature, weather conditions, a specific carrier signal, a specific character text as an automated text response 30, a picture file, etc. Typical input conditions 50 may include an "if" statement, an "if and" statement, a "when" statement, a "while" loop, etc.

An incoming message prompts the application software 20 to acquisition a particular response bank 80 of the web-based database 60. Parametric constraints set for that response bank 80 may include the use of pattern recognition or not. If pattern recognition is programmed, the application software 20 anticipates a desired response through the use of algorithms and generates an automated text message 30. If pattern recognition is not programmed, the application software 20 selects the pre-set automated text message 30 for the response. The response bank 80 contains a multitude of responses ranging from a simple text message to messages containing animated pictures and movies. The responses may also include any of the physical criteria 40 that the application software 20 dictates to acquisition based upon the input conditions 50. Therefore, the responses are not only conditioned based upon the physical criteria 40, but the physical criteria 40 themselves may be part of the automated text message 30 response. For instance, an incoming message may trigger an automated text message 30 of a picture of a school and a message reading "in class" if the application software 20 determines that the user's GPS coordinates match that of the school's and the time parameters for being in class are met. There are separate response banks 80 for each incoming message carrier signal so as to further tailor the response to each sender of an incoming message. A user may want to respond differently to person X while at school than when responding to person Y. A user might also want to disengage the system 10 for a particular sender so that no automated text message 30 is sent to that sender.

In an alternative embodiment, the application software 20 prompts the mobile electronic device 11 to emit a specific tone and announce the entity of the sender of the incoming message. In this embodiment, the mobile electronic device 11 must be a smartphone or tablet type device 11 as opposed to a mere cellular phone. In this embodiment, application software 20 includes additional input conditions 50 to enable a user to associate a specific tone and a name for the entity of the sender.

In an alternative embodiment, the application software 20 initially responds with an automated text message 30 asking the sender of the incoming message to opt into or out of engagement with the system 10 for senders who have not previously opted in. If a sender opts in, then the system 10 operates as described above. If a sender opts out, the user is informed of the desire to opt out and no automated text message 30 will be sent to that sender, regardless of the parametric constraints and response bank 80 established for that sender.

FIG. 2 represents a typical decision tree flow chart that incorporates seven (7) parametric constraints. The system 10 is not limited to the use of seven (7) parametric constraints, and depictions in FIG. 2 are not to be interpreted as limiting factors, as they are for illustrative purposes only. Once activated, the application software 20 prompts a user to set up parametric constraints via the interfacing unit 100. If the user denies this request, the application software 20 defaults to the existing settings unless a user requests the application software to clear the settings. The clearing of settings is preferably completed by the clearing of certain processor registers of the mobile electronic device 11; however, other methods of clearing the settings may be utilized without deviating from the teachings of the system 10. If the user accepts to this request, a user is then prompted to input the parametric constraints for each possible sender, thereby creating response banks 80 with the web-based database 60. Once completed, the application software 20 prompts the user to engage the use of the system 10. If the user denies this, the application software 20 is placed in dormant mode until activated again. If the user accepts this, a run-time while loop is initiated to continually operate the application software 20 until prompted to end.

Figure 3:
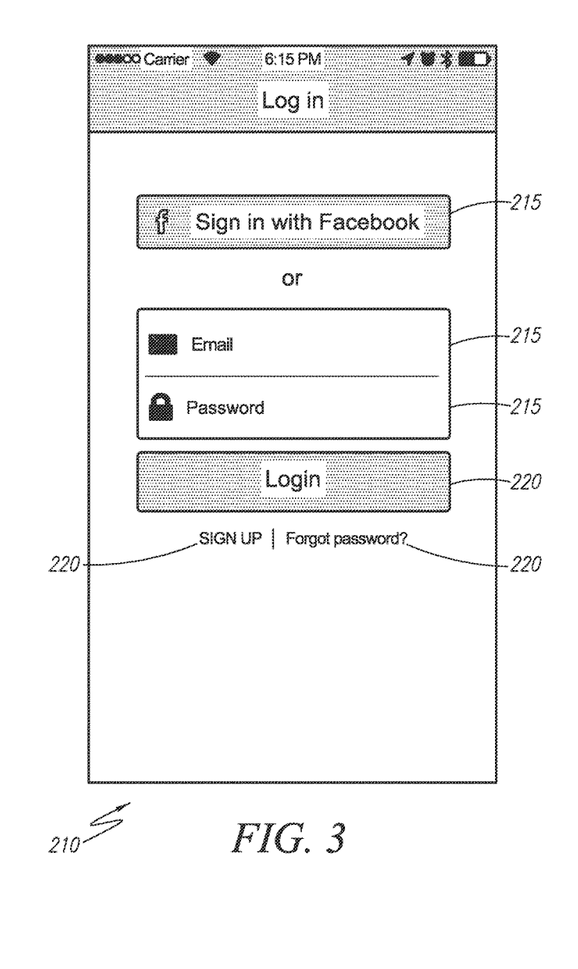
FIG. 3 is a log in graphical screen 210 as used with the automated text response system 10, in accordance with the preferred embodiment of the present invention.

Referring next to FIG. 3, a log-in graphical screen 210 as used with the automated text response system 10 is shown. The log-in graphical screen 210 is a graphical representation as would be seen upon a mobile electronic device 11. The user is presented with a multiple log-in access methods 215 such as email address, social media applications, and a pre-determined password. A similar screen allowing for an initial sign on process is also envisioned. A series of first auxiliary control 220 allow for functionality such as login, initial signup, forgotten passwords and the like. The presence or lack of first auxiliary control 220 is not intended to be a limiting factor of the present invention. It is envisioned that the log-in graphical screen 210 would only be accessed during initial installation and use of the automated text response system 10, as automatic login would be allowed for subsequent access using the administrative features of the operating system of the mobile electronic device 11.

Figure 4:
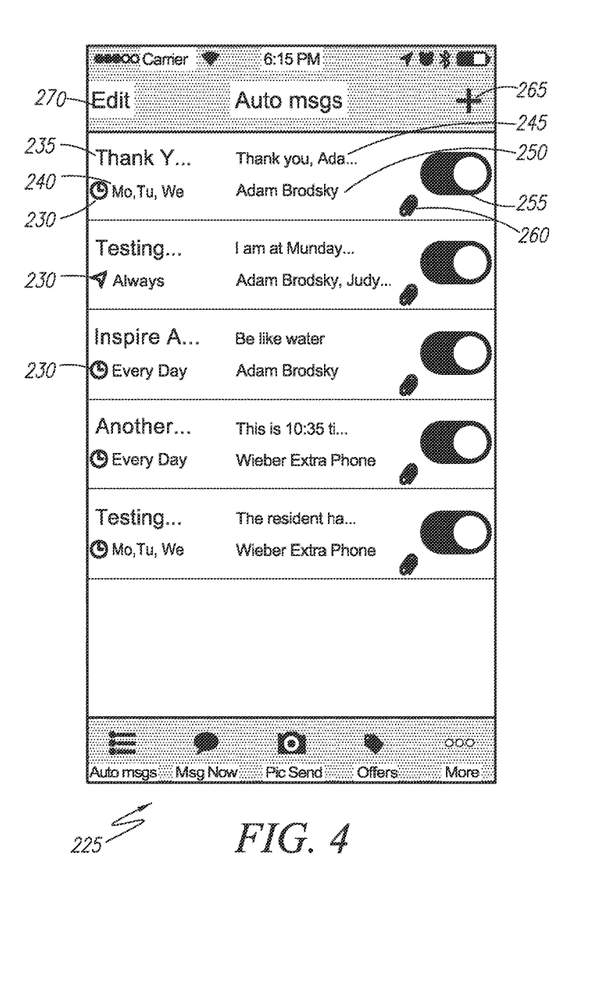
FIG. 4 is an auto message graphical screen 225 as used with the automated text response system 10, in accordance with the preferred embodiment of the present invention.

Referring now to FIG. 4, an auto message graphical screen 225 as used with the automated text response system 10 is depicted. The log-in graphical screen 210 is a graphical representation as would be seen upon a mobile electronic device 11. Said auto message graphical screen 225 is used to control and edit pre-existing automated messages as provided by the automated text response system 10. A series of individual automated messages 230 are listed on the log-in graphical screen 210. Each individual automated message 230 is provide with additional data such as message header 235, a message delivery schedule 240, a message content 245, a message recipient 250, a message activation toggle 255, and a message attachment icon 260. Such a listing of individual automated messages 230 is not intended to be all inclusive and is not intended as a limiting factor of the present invention. A message add selection button 265 is provided to allow for additions to the individual automated messages 230 while a message edit selection button 270 allows for modifications to existing individual automated messages 230 or removal of individual automated messages 230 in their entirety.

Figure 5:
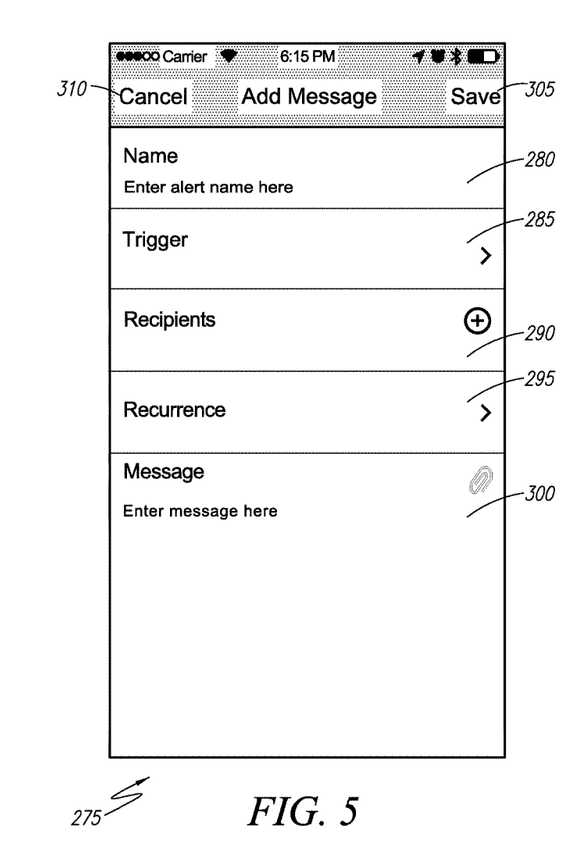
FIG. 5 is a add auto message graphical screen 275 as is used with the automated text response system 10, in accordance with the preferred embodiment of the present invention.

Referring next to FIG. 5, an add auto message graphical screen 275 as used with the automated text response system 10 is disclosed. The add auto message graphical screen 275 is a graphical representation as would be seen upon a mobile electronic device 11. Said add auto message graphical screen 275 is accessed by the message add selection button 265 (as shown in FIG. 4) The add auto message graphical screen 275 provides the user the ability to add an auto message name 280, an auto message trigger 285, an auto message recipient 290, an auto message schedule 295, and an auto message content 300. As aforementioned described, such content is not intended to be a limiting factor of the present invention. An auto message save button 305 is provided to allow the content to be saved and added to the auto message graphical screen 225 (as shown in FIG. 4). Likewise, an auto message cancel button 310 is provided to allow for the exiting the add auto message graphical screen 275 without saving inputted data.

Figure 6:
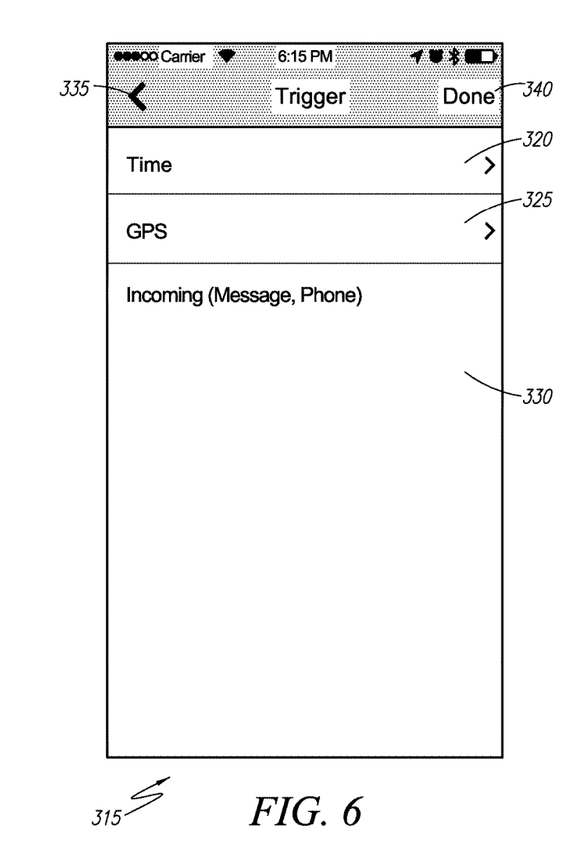
FIG. 6 is a trigger selection graphical screen 315 as is used with the automated text response system 10, in accordance with the preferred embodiment of the present invention.

Referring now to FIG. 6, a trigger selection graphical screen 315 as used with the automated text response system 10 is disclosed. The trigger selection graphical screen 315 is a graphical representation as would be seen upon a mobile electronic device 11. The trigger selection graphical screen 315 is accessed by the auto message trigger 285 (as shown in FIG. 5). It allows for use of external stimulus or inputs to automatically activate the sending of specific messages as determined by the automated text response system 10. Should the user wish to send a message at a specific time, a time trigger selection option 320 is chosen. Should the user wish to send a message once the mobile electronic device 11 is at specific location, a GPS trigger selection option 325 is chosen. Finally, should the user wish to send a message when a specific incoming phone call or incoming message is received; an incoming communication selection option 330 is chosen. Further information on the time trigger selection option 320 and the GPS trigger selection option 325 is provided herein below. Additionally, a first return button 335 allows the user to return the add auto message graphical screen 275 (as seen in FIG. 5), while a first done button 340 allows access to the auto message graphical screen 225 (as seen in FIG. 4) directly.

Figure 7:
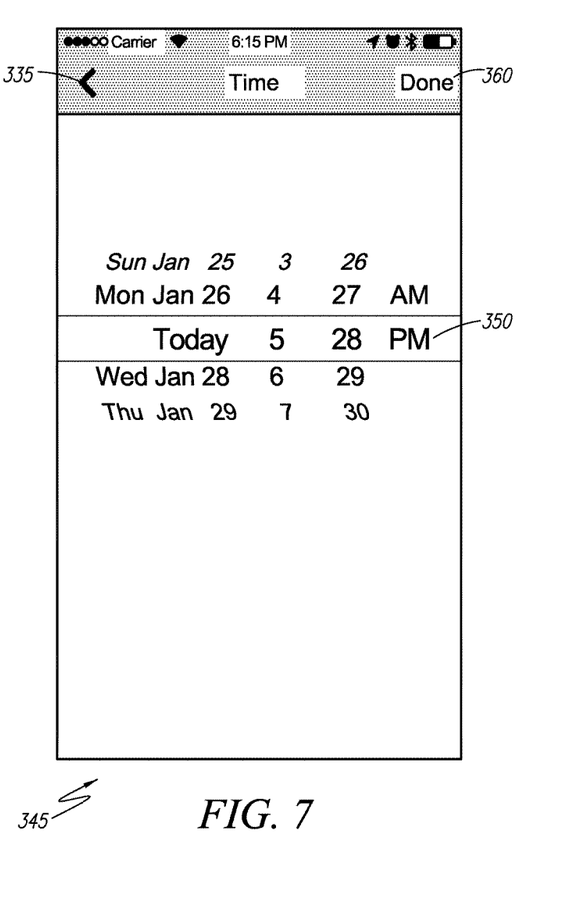
FIG. 7 is a time trigger graphical screen 345 as us used with the automated text response system 10, in accordance with the preferred embodiment of the present invention.

Referring next to FIG. 7, a time trigger graphical screen 345 as used with the automated text response system 10 is disclosed. The time trigger graphical screen 345 is a graphical representation as would be seen upon a mobile electronic device 11. Time selection is made by a rotary selection control 350 which allows for parameters such as date, hour, and minute as depicted. Additional parameters such as year and second are also envisioned and lack thereof should not be interpreted as a limiting factor of the present invention. Additionally, a second return button 355 allows the user to return the trigger selection graphical screen 315 (as seen in FIG. 6), while a second done button 360 allows access to the auto message graphical screen 225 (as seen in FIG. 4) directly.

Figure 8:
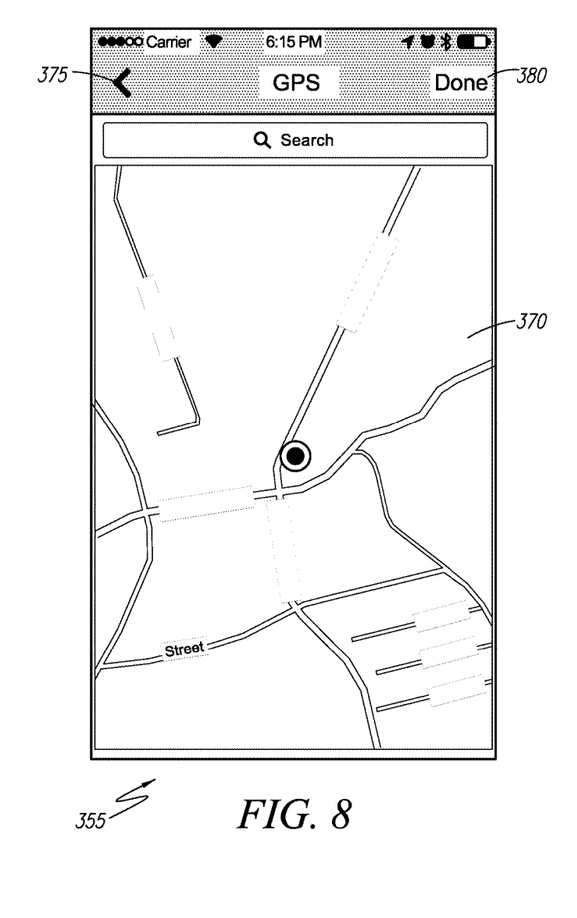
FIG. 8 is a second return button 355 as us used with the automated text response system 10, in accordance with the preferred embodiment of the present invention.

Referring now to FIG. 8, a second return button 355 as used with the automated text response system 10 is depicted. The second return button 355 is a graphical representation as would be seen upon a mobile electronic device 11. Location selection is made by the user via a map location icon 370. Said feature allows triggering of automated messages when the user reaches a defined GPS location. Additionally, a third return button 375 allows the user to return the trigger selection graphical screen 315 (as seen in FIG. 6), while a third done button 380 allows access to the auto message graphical screen 225 (as seen in FIG. 4) directly.

Figure 9:
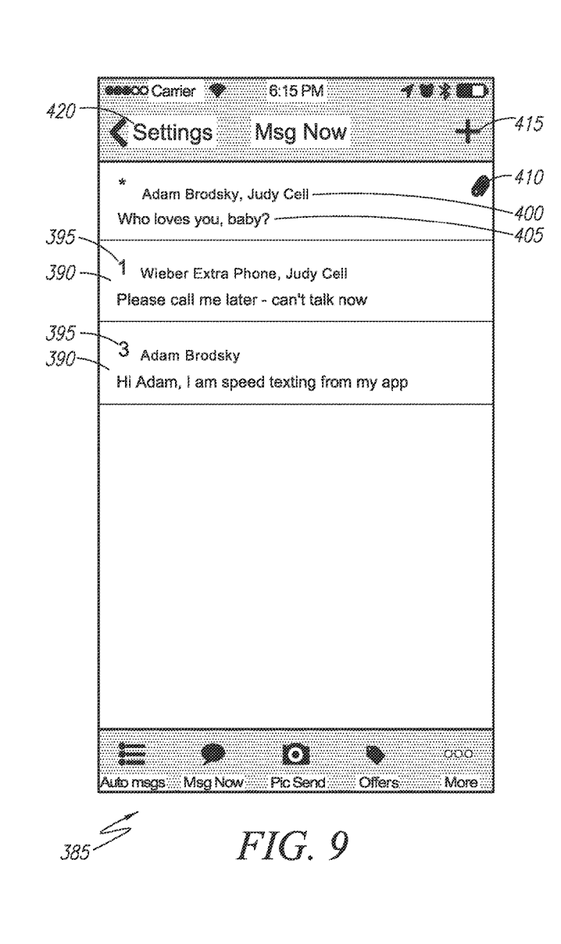
FIG. 9 is a message now settings graphical screen 385 as us used with the automated text response system 10, in accordance with the preferred embodiment of the present invention.

Referring next to FIG. 9, a message now settings graphical screen 385 as used with the automated text response system 10 is shown. The message now settings graphical screen 385 is a graphical representation as would be seen upon a mobile electronic device 11. The message now settings graphical screen 385 allows the user to send an automated text response system 10 to another user of the automated text response system 10. Said feature relies on the user manually activating the sending by a single button push as will be described herein below. The message now settings graphical screen 385 provides a listing of message now sequence listing 390 each with a unique message now number selection 395. The message now sequence listing 390 includes of a message now message recipient 400, a message now message content 405, and a message now message attachment 410, all of which are part of standard messaging content. A message now new message selection button 415 allows the user to add a message now sequence listing 390 while a message now message setting return button 420 permits control to return to the auto message graphical screen 225 (as shown in FIG. 4).

Figure 10:
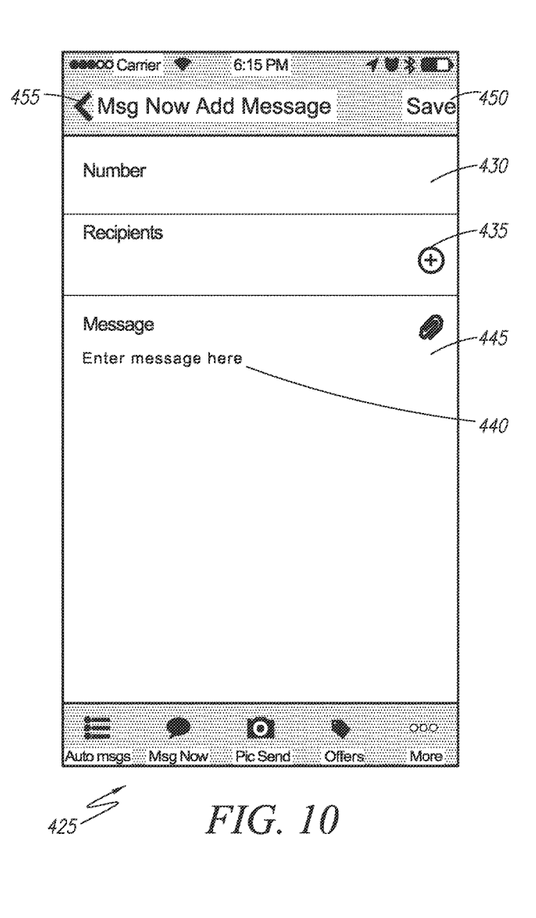
FIG. 10 is a add message now graphical screen 425 as us used with the automated text response system 10, in accordance with the preferred embodiment of the present invention.

Referring now to FIG. 10, an add message now graphical screen 425 as used with the automated text response system 10 is disclosed. The add message now graphical screen 425 is a graphical representation as would be seen upon a mobile electronic device 11. The user would enter a number in an add message now number 430 that would correspond to the message now number selection 395 (as shown in FIG. 9). The message recipient(s) would be added in a add message now recipient 435. As would then be expected, message content would be added in a add message now message content 440 with any corresponding message attachment added with a add message now message attachment 445. When finished, the user would save entered information with a add message now message save button 450 and/or return the message now settings graphical screen 385 (as shown in FIG. 9) via a add message now return button 455.

Figure 11:
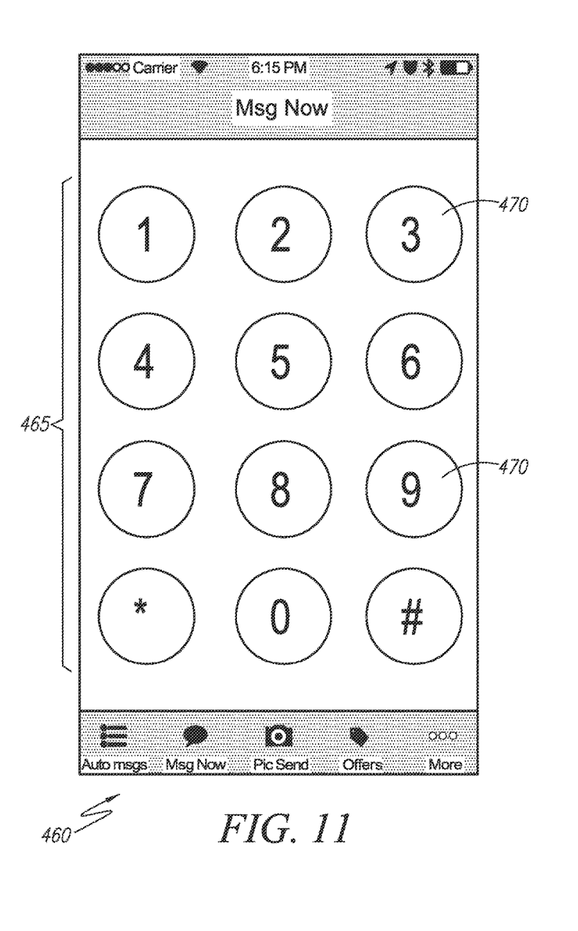
FIG. 11 is a message now activation graphical screen 460 as us used with the automated text response system 10, in accordance with the preferred embodiment of the present invention.

Referring next to FIG. 11, a message now activation graphical screen 460 as used with the automated text response system 10 is depicted. The message now activation graphical screen 460 is a graphical representation as would be seen upon a mobile electronic device 11. The user is provided with a number pad 465 with individual number button 470 zero to nine (0-9). Upon pressing (activation) of the individual number button 470, the corresponding add message now number 430 (as seen in FIG. 10) is sent. The user is then automatically returned to the auto message graphical screen 225 (as shown in FIG. 4). Said feature permits the sending of an automated text response system 10 with minimal effort and distraction which is viewed as beneficial when performing other tasks requiring higher levels of awareness and concentration.

Figure 12:
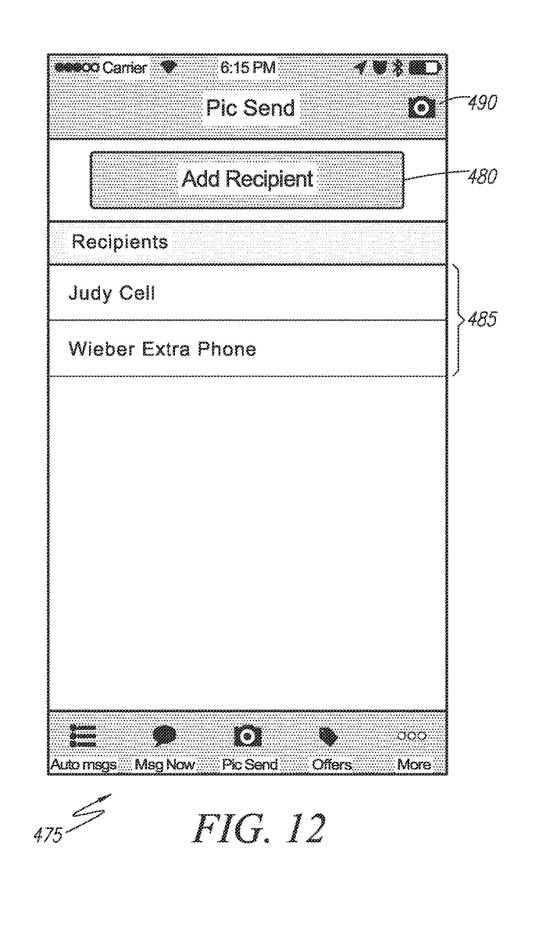
FIG. 12 is a pic send graphical screen 475 as us used with the automated text response system 10, in accordance with the preferred embodiment of the present invention.

Referring now to FIG. 12, a picture send graphical screen 475 as used with the automated text response system 10 is depicted. The picture send graphical screen 475 is a graphical representation as would be seen upon a mobile electronic device 11. The picture send graphical screen 475 allows the user to automate sending of photos via text message. The user would add intended recipients by use of an add picture recipient button 480. Upon selection using standard contact protocols, the intended recipients will be listed in a picture recipient list 485. The user would then activate a camera access button 490 in the upper right-hand corner of the picture send graphical screen 475. The user would then take a photograph following normal protocols associated with the mobile electronic device 11. Upon completion, the picture will be sent to those in the picture recipient list 485.

Figure 13:
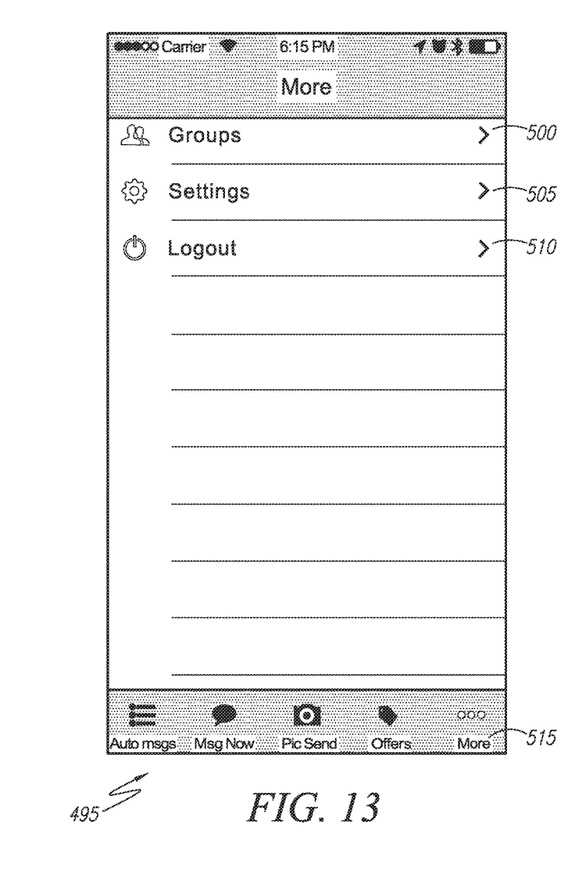
FIG. 13 is a more graphical screen 495 as us used with the automated text response system 10, in accordance with the preferred embodiment of the present invention.

Referring next to FIG. 13, a more graphical screen 495 as used with the automated text response system 10 is depicted. The more graphical screen 495 is a graphical representation as would be seen upon a mobile electronic device 11. The more graphical screen 495 provides access to a groups selection option 500, a setting selection option 505, and a logout selection option 510. Selection of the groups selection option 500 will take the user to another graphical screen which will be described in greater detail herein below. The settings selection option 505 will take the user to another graphical screen which will be described in greater detail herein below. Finally, the logout selection option 510 will allow the user to leave the application controlling the automated text response system 10 on the mobile electronic device 11 in a customary manner. Future access to the mobile electronic device 11 will require access through the log-in graphical screen 210 (as shown in FIG. 3). The user can return the auto message graphical screen 225 (as shown in FIG. 4) via activation of a more selection button 515.

Figure 14:
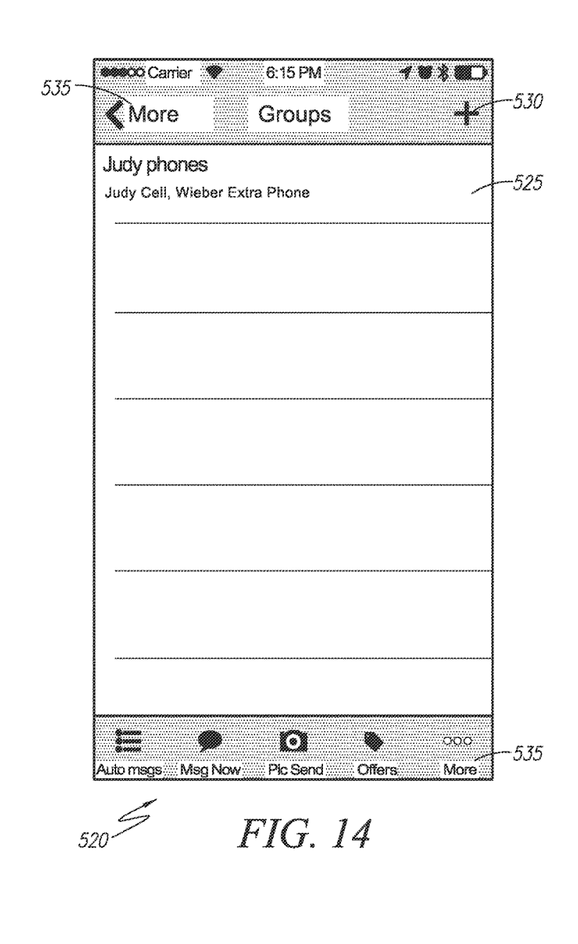
FIG. 14 is a groups control graphical screen 520 as us used with the automated text response system 10, in accordance with the preferred embodiment of the present invention.

Referring now to FIG. 14, a groups control graphical screen 520 as used with the automated text response system 10 is depicted. The groups control graphical screen 520 is a graphical representation as would be seen upon a mobile electronic device 11. The groups control graphical screen 520 is accessed by the groups selection option 500 (as shown in FIG. 13) as aforementioned described. Said groups control graphical screen 520 provides the user access to a groups list 525. The groups list 525 provides the mobile electronic device 11 with a selection of multiple recipients so as to make multiple selections easier. Such a feature is envisioned as useful when sending automated messages to large groups such as family members, co-workers or the like. Additional groups are selected by a groups add button 530. The user is returned the more graphical screen 495 (as shown in FIG. 13) by use of a more return button 535.

Figure 15:
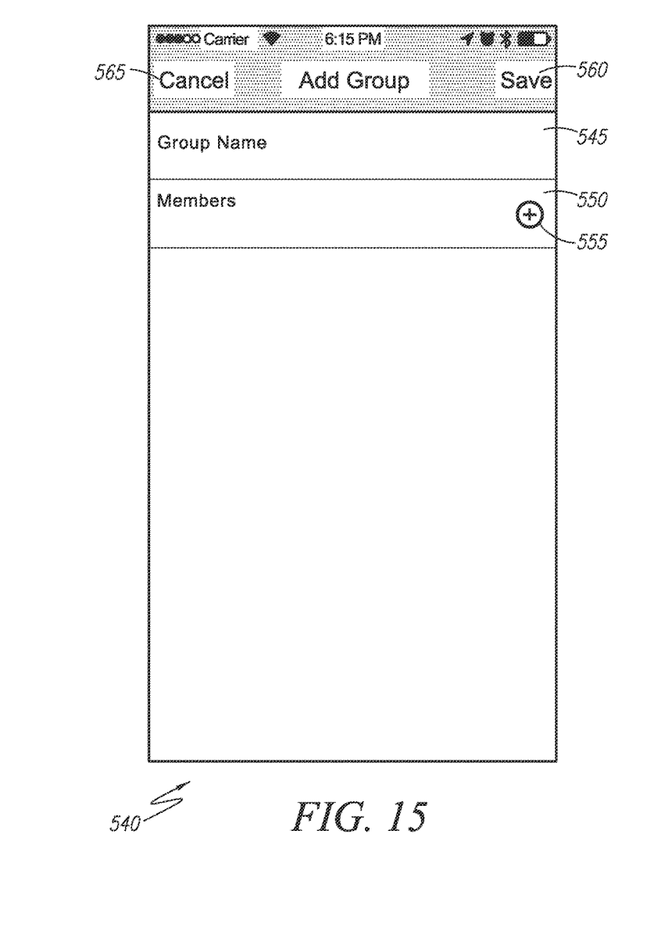
FIG. 15 is a add group graphical screen 540 as us used with the automated text response system 10, in accordance with the preferred embodiment of the present invention.

Referring next to FIG. 15, an add group graphical screen 540 as used with the automated text response system 10 is depicted. The add group graphical screen 540 is a graphical representation as would be seen upon a mobile electronic device 11. The add group graphical screen 540 is accessed by the groups list 525 (as shown in FIG. 14) as aforementioned described. Said add group graphical screen 540 provides the user the ability to add new groups or edit existing groups. A group name field 545 permits the addition of a group name. A group member field 550 permits the addition of individual recipients to the group. Said selection of the individual recipients is performed by a add group member recipient button 555 using standard contact protocols provided by the mobile electronic device 11. When complete a group definition save button 560 is activated to save the selections. A group definition cancel button 565 returns the user to the more graphical screen 495 (as shown in FIG. 13).

Figure 16:
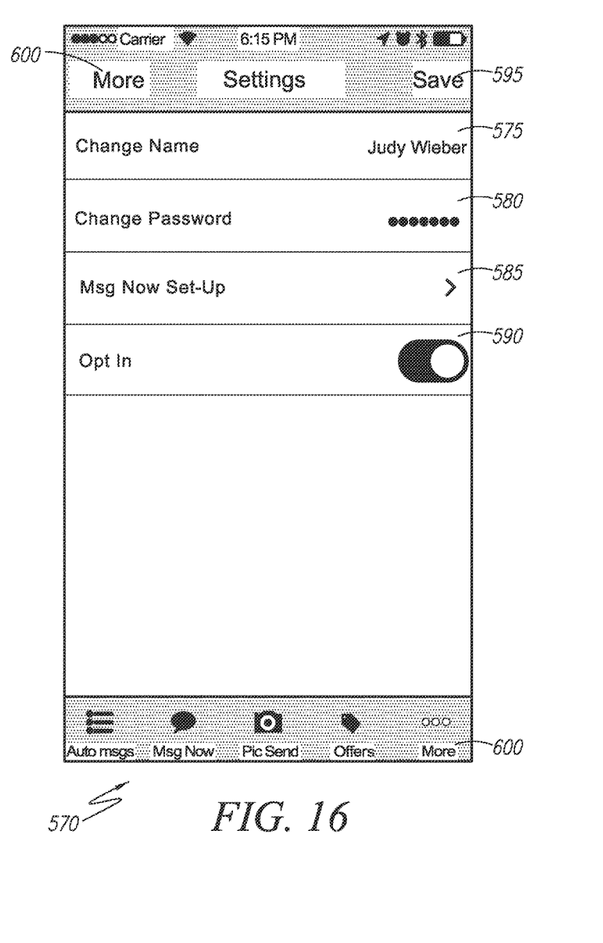
FIG. 16 is a settings graphical screen 570 as us used with the automated text response system 10, in accordance with the preferred embodiment of the present invention; and, FIG. 17 is an offers graphical screen 605 as us used with the automated text response system 10, in accordance with the preferred embodiment of the present invention.

Referring now to FIG. 16, a settings graphical screen 570 as used with the automated text response system 10 is depicted. The settings graphical screen 570 is a graphical representation as would be seen upon a mobile electronic device 11. The settings graphical screen 570 is accessed by the groups selection option 500 (as shown in FIG. 13) as aforementioned described. The user is able to change logon parameters to the mobile electronic device 11 through a user name field 575 and a user password field 580. A message now setup option 585 turns control over to the message now settings graphical screen 385 (as shown in FIG. 9). All users of the automated text response system 10 can decide to participate in usage by control provided by an opt-in toggle selection 590. Such action would be enacted when a specific user of the mobile electronic device 11 does not wish to be disturbed by automatic text messages from another. Any variables changed on the settings graphical screen 570 are then saved by use of a settings save button 595. The user is returned the more graphical screen 495 (as shown in FIG. 13) by use of a settings return button 600.

Figure 17:
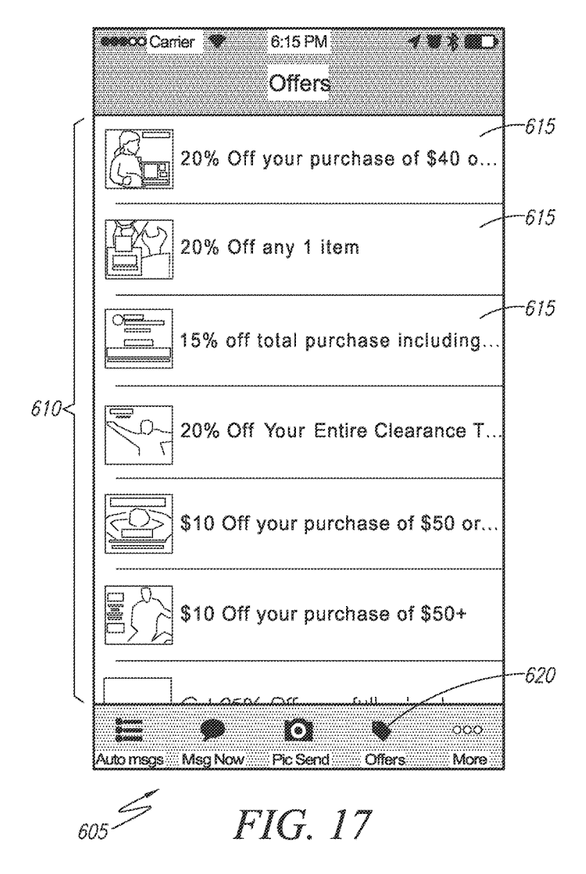

Referring finally to FIG. 17, an offers graphical screen 605 as used with the automated text response system 10 is depicted. The offers graphical screen 605 is a graphical representation as would be seen upon a mobile electronic device 11. The offers graphical screen 605 contains a list of offers 610 that may be used at local retailers for discounts on a variety of items/services. The list of offers 610 provides individual offer in store codes 615 that can be used to receive the advertised discount. Each individual offer in store codes 615 includes an offer email box button 620 which allows the user to email the ad to yourself or someone else. The individual offer in store codes 615 would be maintained by a third party company which provides said offers on behalf of retailers near the physical location of the user.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized in a simple and straightforward manner with little or no training. After initial purchase or acquisition of the system 10, it would be configured as indicated in FIGS. 1 and 2. Operation and use of the automated text response system 10 would be in accordance with FIGS. 3 through 17.

The method of utilizing the system 10 may be achieved by performing the following steps: acquiring a model of the system 10; ensuring the version of the system 10 has application software 20 compatible with the operating system of the mobile electronic device 11 upon which the application software 20 is to be installed; installing the application software 20 on the mobile electronic device 11; allowing the application software establish communication with the web-based data base 60 and transfer the unique code key 70 to be stored with the web-based database 60; employing the interfacing unit 100 of the mobile electronic device 11 to set up response banks 80 for each potential sender's carrier signal; employing the interfacing unit 100 to set up parametric conditions such as input conditions 50 and physical criteria 40 for each response bank 80; allowing the application software 20 to remit automated text message 30 responses to senders of incoming messages; continually tailoring the parametric conditions for each response bank 80 as desired; and, benefiting from the ability to automatically communicate via tailored automated text message 30 responses.

After installation of the automated text response system 10 on an appropriate mobile electronic device 11, the user would begin configuration using the log-in graphical screen 210. Additional setup configuration would then be performed using the add auto message graphical screen 275, the message now settings graphical screen 385, the add message now graphical screen 425, the picture send graphical screen 475, the picture send graphical screen 475, the more graphical screen 495, the add group graphical screen 540, and the settings graphical screen 570. Various specific messaging functionality depending on the specific use scenarios would be configured by use of the trigger selection graphical screen 315, the time trigger graphical screen 345, the second return button 355, the message now activation graphical screen 460, and the groups control graphical screen 520. Active control of the mobile electronic device 11 would be governed through use of the auto message graphical screen 225. Various purchasing offers, depending on geographic location would be governed by use of the offers graphical screen 605.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A mobile electronic device incorporating an automated message service response system, comprising:
   said mobile electronic device comprising an interface unit;
   a database configured to store coalesced data and generate at least one response bank with said coalesced data; and,
   an application software stored on processing unit of said mobile electronic device configured to establish communication between a mobile electronic device and said database;
   wherein:
      said application software enables data acquisition and compilation between said mobile electronic device and said database via a carrier signal;
      said application software establishes a key code for said mobile electronic device to be carried along with said carrier signal;
      said application software enables generation of each response bank with associated parametric constraints via use of said interface unit of said mobile electronic device when said key code is recognized by said database;
      said application software enables storage of at least one automated message within each response bank that are conditioned upon said parametric constraints;
      said application software enables association of each response bank with a carrier signal of an incoming message to said mobile electronic device; and,
      said application software selectively generates and delivers a desired automated message selected from an associated response bank, either based upon receipt of an incoming message, or upon manual activation thereof.

2. The mobile electronic device recited in claim 1, wherein said application software is further configured to emit a specific tone and announce a name of a sender of said incoming message.

3. The mobile electronic device recited in claim 1, wherein said application software is further configured to deliver an initial response asking a sender to engage in use of said system.

4. The mobile electronic device recited in claim 1, further comprising a selectable feature enabling activation or deactivation from communication with another database incorporating said system.

5. The mobile electronic device recited in claim 1, wherein said system is selectively capable of delivering said desired automated message in response to said incoming message in the form of one of the following: a time of day, a location, a scanning of a bar code, a proximity to an RF-based tag, a voice command, an incoming phone calls, and an incoming email.

6. The mobile electronic device recited in claim 1, wherein said database resides in a remote location therefrom.

7. The mobile electronic device recited in claim 1, wherein said parametric constraints are generated by input within said application software via said interface unit for subsequent storage within said database.

8. The mobile electronic device recited in claim 7, wherein said parametric constraints comprise physical criteria.

9. The mobile electronic device recited in claim 7, wherein said parametric constraints comprise an input condition.

10. The mobile electronic device recited in claim 7, wherein an individualized set of parametric constraints are capable of being inputted within said application software via said interface unit and associated with a particular sender of said incoming message.

11. The mobile electronic device recited in claim 10, wherein said parametric constraints comprise physical criteria.

12. The mobile electronic device recited in claim 10, wherein said parametric constraints comprise an input condition.

13. The mobile electronic device recited in claim 1, wherein said automated messages are generated by input within said application software via said interface unit for subsequent storage within each response bank.

14. The mobile electronic device recited in claim 1, wherein an additional automated message is capable of being added to a pre-existing response bank.

15. The mobile electronic device recited in claim 1, wherein each automated message is capable of being edited.

16. The mobile electronic device recited in claim 1, wherein each automated message is delivered via SMS communication protocol.

17. The mobile electronic device recited in claim 1, wherein each automated message is a text message.

18. The mobile electronic device recited in claim 1, wherein each automated message is a pictorial message.

19. The mobile electronic device recited in claim 1, wherein each automated message is a pre-recorded audio clip.

20. The mobile electronic device recited in claim 1, wherein said automated message is a pre-recorded video clip.

21. The mobile electronic device recited in claim 1, wherein GPS coordinates associated with said mobile electronic device are selectively transmitted concurrently with said desired automated message.

22. The system mobile electronic device in claim 1, wherein said application software is capable of delivering said desired automated message to multiple recipients.

23. A mobile electronic device incorporating an automated message service response system, comprising:
   said mobile electronic device comprising an interface unit;
   a database configured to store coalesced data and generate at least one response bank with said coalesced data; and,
   an application software stored on processing unit of said mobile electronic device configured to establish communication between a mobile electronic device and said database;
   wherein:
      said application software enables data acquisition and compilation between said mobile electronic device and said database via a carrier signal;
      said application software establishes a key code for said mobile electronic device to be carried along with said carrier signal;
      said application software enables generation of each response bank with associated parametric constraints via use of said interface unit of said mobile electronic device when said key code is recognized by said database;

said application software enables storage of at least one automated message within each response bank that are conditioned upon said parametric constraints;

said application software enables association of each response bank with a carrier signal of an incoming message to said mobile electronic device;

said application software selectively generates and delivers a desired automated message selected from an associated response bank, either based upon receipt of an incoming message, or upon manual activation thereof; and, said application software comprises pattern recognition to identify and anticipate said desired automated message upon receipt of said incoming message and selectively delivers said desired automated message.

24. The mobile electronic device recited in claim 23, wherein said application software is further configured to emit a specific tone and announce a name of a sender of said incoming message.

25. The mobile electronic device recited in claim 23, wherein said application software is further configured to deliver an initial response asking a sender to engage in use of said system.

26. The mobile electronic device recited in claim 23, further comprising a selectable feature enabling activation or deactivation from communication with another database incorporating said system.

27. The mobile electronic device recited in claim 23, wherein said system is selectively capable of delivering said desired automated message in response to said incoming message in the form of one of the following: a time of day, a location, a scanning of a bar code, a proximity to an RF-based tag, a voice command, an incoming phone calls, and an incoming email.

28. The mobile electronic device recited in claim 23, wherein said database resides in a remote location therefrom.

29. The mobile electronic device recited in claim 23, wherein said parametric constraints are generated by input within said application software via said interface unit for subsequent storage within said database.

30. The mobile electronic device recited in claim 29, wherein said parametric constraints comprise physical criteria.

31. The mobile electronic device recited in claim 29, wherein said parametric constraints comprise an input condition.

32. The mobile electronic device recited in claim 29, wherein an individualized set of parametric constraints are capable of being inputted within said application software via said interface unit and associated with a particular sender of said incoming message.

33. The mobile electronic device recited in claim 32, wherein said parametric constraints comprise physical criteria.

34. The mobile electronic device recited in claim 32, wherein said parametric constraints comprise an input condition.

35. The mobile electronic device recited in claim 23, wherein said automated messages are generated by input within said application software via said interface unit for subsequent storage within each response bank.

36. The mobile electronic device recited in claim 23, wherein an additional automated message is capable of being added to a pre-existing response bank.

37. The mobile electronic device recited in claim 23, wherein each automated message is capable of being edited.

38. The mobile electronic device recited in claim 23, wherein each automated message is delivered via SMS communication protocol.

39. The mobile electronic device recited in claim 23, wherein each automated message is a text message.

40. The mobile electronic device recited in claim 23, wherein each automated message is a pictorial message.

41. The mobile electronic device recited in claim 23, wherein each automated message is a pre-recorded audio clip.

42. The mobile electronic device recited in claim 23, wherein said automated message is a pre-recorded video clip.

43. The mobile electronic device recited in claim 23, wherein GPS coordinates associated with said mobile electronic device are selectively transmitted concurrently with said desired automated message.

44. The mobile electronic device recited in claim 23, wherein said application software is capable of delivering said desired automated message to multiple recipients.

* * * * *